Patented Aug. 5, 1941

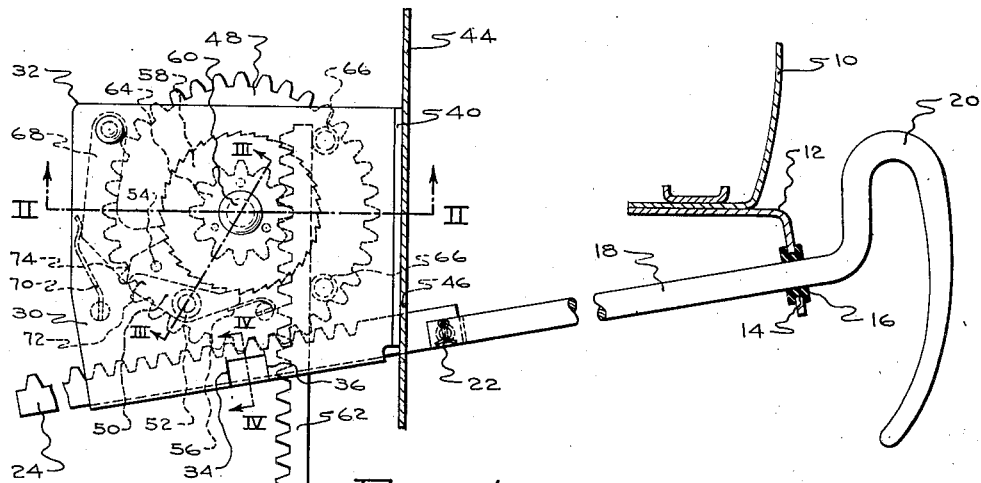

2,251,893

UNITED STATES PATENT OFFICE 2,251,893

BRAKE ACTUATOR

Samuel A. Snell, Jackson, Mich., assignor to Townsend F. Beaman, Jackson, Mich., as trustee Application February 24, 1940, Serial No. 320,587

5 Claims. (Cl. 74—503)

The present invention relates to parking brake structure for automobiles, being concerned with the type broadly disclosed in my co-pending application Serial No. 253,985, filed February 1, 1939, and constituting another embodiment of the idea presented in my co-pending application Serial No. 308,609, filed December 11, 1939.

In providing a parking brake actuator which is within convenient reach of the operator and capable of being returned to an out-of-the-way position after brake application without brake release, certain manufacturers have demanded a construction giving full brake application by a single outward stroke. The desire to more fully meet this requirement than is practical with the construction shown in the aforesaid application Serial No. 308,609, has resulted in the present invention.

The objects and advantages of the present invention reside in the construction, combination and arrangement of parts which provide an improved parking brake actuator capable of fully applying the brakes by a single outward stroke with a non-releasing return stroke.

Referring to the drawing, wherein a single embodiment of the invention is illustrated to disclose the principles thereof, Fig. 1 is a cross-sectional view through the dash showing the brake actuator in side elevation, Fig. 2 is a cross-sectional view taken on line II—II of Fig. 1, Fig. 3 is a fragmentary cross-sectional view taken on line III—III of Fig. 1, and Fig. 4 is a view similar to Fig. 3 taken on line IV—IV of Fig. 1.

The instrument panel 10 of an automobile is shown provided with a guide bracket 12 having a guide opening 14 receiving a rubber grummet 16. A hand rod 18 with a grip 20 is guided for axial movement in the grummet 16. At its inner end, the rod 18 is pinned at 22 to a rack 24 which is guided by a channel portion 26 formed between the vertical sides 28 and 30 of the bracket 32 by piercing the side 30 at 34 and 36 and deflecting the portion 38 inwardly. The bracket 32 has flanges 40 and 42 for securing the brackets 32 to the dash panel 44. An opening 46 in the dash receives the rack 24 for axial movement.

The motion reducing unit supported for rotation in the bracket 32 comprises a large pinion 48 meshing with the rack 24. A drive pawl 50 is pivotally carried upon the pinion 48 through a pin 52. A stop pin 54 limits movement of the pawl 50 in one direction. A spring 56 upon the pinion 48 urges the pawl 50 into engagement with the teeth of the ratchet wheel 58. The pinion 48 and wheel 58 are supported upon the shaft 60 for relative rotation but rotated as a unit counter-clockwise as viewed in Fig. 1 when the pinion 48 is driven counter-clockwise with the pawl 50 engaging the teeth of the wheel 58.

A rack rod 62 is held in engagement with a small pinion 64 through guide pins 66 rotated as a unit with the wheel 58. The small pinion 64 and the ratchet wheel 58 are connected together for simultaneous rotation about the shaft 60. Suitable connections (not shown) attach the rod 62 to the brakes. A holding pawl 68 is urged by a spring 70 into engagement with the teeth of the wheel 58.

The operation of the above described brake actuator follows: The rod 62 is shown in Fig. 1 in a brake released position. To apply the brakes the operator through the grip 20 pulls the rod 18 outwardly into the occupant's compartment of the automobile. Movement of the rod 18 to the right will cause the large pinion 48 to be rotated counter-clockwise through the rack 24. The drive pawl 50 through engagement with the teeth of the ratchet wheel 58 will cause the wheel 58 and the small pinion 64 to rotate as a unit with the large pinion 48. Rotation of the pinion 64 will move the rack rod 62 upwardly to apply the brakes with mechanical advantage proportionate to the difference in diameter of the pinions 48 and 64. Preferably the rack 24 is of sufficient length to fully apply the brakes through a single outward stroke. With the arrangement shown in Fig. 1, something less than a complete rotation is all that is necessary to fully apply the brakes at any time. It will be understood, however, that through the operation of the holding pawl 68, the wheel 58 may be advanced through a series of short ratchet strokes of the rod 18. With the brake fully applied, the rod 18 and rack 24 are returned to the position shown in Fig. 1. During the return stroke, the pinion 48 will also be returned to the position shown in Fig. 1, with pawl 50 freely passing over the teeth of the wheel 58.

To release the brakes, the rod 18 and rack 24 are urged to the left from the position shown in Fig. 1 to rotate the pinion 48 sufficiently to bring the end 72 of the pawl 50 into engagement with the cam shoulder 74 of the holding pawl 68. As the spring 70 is stronger than the spring 56, the pawl 50 will be pivoted out of engagement with the teeth of the wheel 58. When the end 72 engages the stop pin 54, the continued movement of the pinion 48 will cause the pawl 68 to be pivoted out of engagement with the teeth of the wheel 58 whereupon the retractor springs (not shown) of the brakes will move the rod 62 to a brake releasing position as the ratchet wheel 58 and pinion 64 are then free to rotate clockwise upon the shaft 60.

Having described my invention, what I desire to protect by Letters Patent and claim is:

1. A push-pull parking brake actuator comprising a push-pull member including a gear rack, a relatively large pinion continuously meshing with said rack supported for rotation about a fixed axis, a smaller pinion supported for rotation about said axis, a second gear rack continuously meshing with said smaller gear for applying and releasing the brake upon axial movement thereof in opposite directions, a one-way clutch imposed between said pinions for causing said pinions to rotate as a unit when said member is pulled outwardly, means for dogging said smaller pinion when rotated into a brake applying position, said larger pinion having declutched retro-movement into its initial position upon an inward push movement of said member.

2. A push-pull parking brake actuator comprising a push-pull member, a gear rack connected to said member and movable thereby, a relatively large pinion meshing with said rack and supported for rotation about a fixed axis, a smaller pinion supported for rotation about said axis having a ratchet as a unitary part thereof, a gear rack meshing with said smaller pinion for applying and releasing the brake upon axial movement in opposite directions, a one-way clutch pawl carried by said larger pinion and engaging with said ratchet for causing the said pinions to rotate as a unit when said member is pulled outwardly, means for dogging said ratchet when said smaller pinion is rotated into a brake applying position, said larger pinion having a declutched retro-movement into its initial position upon an inward push movement of said member.

3. A push-pull parking brake actuator comprising a push-pull member, a rotatable part of relatively large diameter, means connected to said member and movable thereby having peripheral engagement with said part to rotate the same about a fixed axis, a second part of smaller diameter than said first part supported for rotation about said fixed axis, axially movable means having peripheral engagement with said second part and actuated thereby for applying and releasing the brake upon axial movement in different directions, a one-way clutch imposed between said parts causing the same to rotate as a unit when said member is pulled outwardly, means for dogging said second part when rotated into a brake applying position, said first part having declutched retro-movement to its initial position upon an inward push movement of said member.

4. A push-pull parking brake actuator comprising a push-pull member including a gear rack portion, a supporting bracket comprising a pair of spaced side members, guiding means connected between said side members in which said rack portion is supported and guided, a shaft supported between said side members, large and small pinions supported for unitary as well as relative rotation upon said shaft, said large pinion meshing with said gear rack portion, means constituting a one-way clutch imposed between said pinions, a second gear rack portion, means for supporting and guiding said second gear rack portion between said side members in mesh with said small pinion, said second gear rack portion being connectable to the brake for applying and releasing the same upon axial movement in opposite directions, said gear rack portions having their lines of movement in off-set relation.

5. A push-pull parking brake actuator comprising a push-pull member, a supporting bracket, a pair of relatively rotatable parts of different diameters supported in said bracket for rotation around the same axis, a one-way clutch means supported upon the larger of said parts and engageable with said other part for rotating said part as a unit in one direction, means operatively connecting said push-pull member to said large part for rotating the same upon outward pull movement, means operatively connected to said second part for applying and releasing the brakes upon movement of said second part in opposite directions, means dogging said second part in all brake applying positions, and operative mechanism associated with said dogging and clutch means for rendering the both inoperative to release the brakes upon predetermined rotation of said first part resulting from an inward push exerted upon said member.

SAMUEL A. SNELL.